United States Patent [19]
Vaahs et al.

[11] Patent Number: 5,189,132
[45] Date of Patent: Feb. 23, 1993

[54] POLYMERIC HYDRIDOCHLOROSILAZANES, PROCESS FOR THEIR PREPARATION, CERAMIC MATERIALS CONTAINING SILICON NITRIDE WHICH CAN BE MANUFACTURED THEREFROM, AND THEIR MANUFACTURE

[75] Inventors: Tilo Vaahs, Kelkheim; Thomas Gerdau, Eppstein; Hans-Jerg Kleiner, Kronberg; Marcellus Peuckert, Hofheim am Taunus; Martin Brück, Hofheim am Taunus, all of Fed. Rep. of Germany

[73] Assignee: Hoechst Aktiengesellschaft, Frankfurt am Main, Fed. Rep. of Germany

[21] Appl. No.: 759,035

[22] Filed: Sep. 5, 1991

Related U.S. Application Data

[63] Continuation of Ser. No. 444,053, Nov. 30, 1989, abandoned.

[51] Int. Cl.$^5$ .............................................. C04B 35/58
[52] U.S. Cl. .................................. 528/33; 501/95; 501/96; 501/97; 528/34; 528/35
[58] Field of Search ................. 501/92, 96, 97, 98, 501/90, 95; 528/28, 33, 24, 35

[56] References Cited

U.S. PATENT DOCUMENTS

| | | | |
|---|---|---|---|
| 3,892,583 | 7/1975 | Winter et al. | 106/55 |
| 4,397,828 | 8/1983 | Seyferth et al. | 423/344 |
| 4,482,669 | 11/1984 | Seyferth et al. | 524/442 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,675,424 | 6/1987 | King, III et al. | 556/412 |
| 4,689,252 | 8/1987 | Lebrun et al. | 427/228 |
| 4,742,143 | 5/1988 | Haluska | 528/37 |
| 4,931,513 | 6/1990 | Gerdau et al. | 525/474 |
| 5,066,623 | 11/1991 | Gerdau et al. | 501/97 |
| 5,075,266 | 12/1991 | Gerdau et al. | 501/97 |

FOREIGN PATENT DOCUMENTS

| | | |
|---|---|---|
| 0228148 | 7/1987 | European Pat. Off. |
| 0266912 | 5/1988 | European Pat. Off. |
| 0266918 | 5/1988 | European Pat. Off. |
| 0313878 | 5/1989 | European Pat. Off. |

OTHER PUBLICATIONS

Wills, R. R. et al., *Ceramic Bulletin* 62:904–915 (1983).
*Patent Abstracts of Japan*, vol. 13, No. 339, p. (C-624) [3687] (Jul. 31, 1989).

*Primary Examiner*—Mark L. Bell
*Assistant Examiner*—Alan Wright

[57] ABSTRACT

The invention relates to novel polymeric hydridochlorosilazanes, to their preparation, to their processing to form ceramic materials containing silicon nitride, and to said materials themselves. The polymeric hydridochlorosilazanes are prepared by reacting oligohydridoorganosilazanes of the general formula $(R^1SiHNH)_n$, in which n is about 3 to about 12, with at least one of the chlorosilanes $R^2SiHCl_2$, $R^3SiCl_3$, $Cl_2R^4Si-CH_2CH_2-SiR^4Cl_2$ or $Cl_3Si-CH_2CH_2-SiR^5Cl_2$ at 30° C. to 300° C., where the radicals independently of one another have the following meanings:

$R^1$ = a $C_1$-$C_6$ alkyl or $C_2$-$C_6$ alkenyl group,
$R^2$ = a $C_2$-$C_6$ alkenyl group if $R^2SiHCl_2$ is reacted with the oligosilazanes by itself, or
$R^2$ = a $C_1$-$C_6$ alkyl or $C_2$-$C_6$ alkenyl group if $R^2SiHCl_2$ is reacted with the oligosilazanes as a mixture with other chlorosilanes, and
$R^3$, $R^4$, $R^5$ = a $C_1$-$C_6$ alkyl or $C_{C2}$-$C_6$ alkenyl group, and where $R^3SiCl_3$ is used only as a mixture with at least one of the other chlorosilanes (containing $R^2$, $R^4$ or $R^5$).

The polymeric hydridochlorosilazanes according to the invention can be converted into polysilazanes by reaction with ammonia, and these in turn can be pyrolyzed to form ceramic materials containing silicon nitride.

5 Claims, No Drawings

POLYMERIC HYDRIDOCHLOROSILAZANES, PROCESS FOR THEIR PREPARATION, CERAMIC MATERIALS CONTAINING SILICON NITRIDE WHICH CAN BE MANUFACTURED THEREFROM, AND THEIR MANUFACTURE

This is a continuation of our co-pending application Ser. No. 07/444,053, filed Nov. 30, 1989, now abandoned.

The invention related to novel polymeric hydridochlorosilazanes, to their preparations, to their processing to form ceramic material containing silicon nitride, and to said material itself.

The pyrolysis of polysilazanes to form ceramic material containing silicon nitride has already been described in the literature (R. R. Wills et al., Ceramic Bulletin, vol. 62 (1983), 904–915).

Polysilazanes are normally prepared using chlorosilanes as starting material, which are reacted with ammonia or primary or secondary amines (U.S. Pat. Nos. 4,540,803, 4,543,344, 4,595,775, 4,397,828, 4,482,669). According to U.S. Pat. No. 4,482,669, a dichlorohydridoorganolsilane of the formula $RSiHCl_2$ is reacted with $NH_3$ to give oligohydridoorganosilazanes $(RSiHNH)_n$, which are then condensed to form polysilazanes with the elimination of hydrogen, e.g. with the aid of KH.

The present invention provides novel starting materials for polyhydridosilazanes, i.e. polymeric hydridochlorosilazanes.

Published European patent application 0 266 918 has already disclosed, inter alia, the reaction of oligohydridoorganosilazanes of the formula $(CH_3SiHNH)_n$ with chlorosilanes of the formula $RSiCl_3$ in an inert, substantially anhydrous medium to give preceramic polymers, followed by pyrolysis of the latter, either direct or after treatment with $NH_3$, to form ceramic material.

The present invention relates to a process for the preparation of polymeric hydridochlorosilazanes which comprises reaction oligohydridoorganosilazanes of the general formula $(R^1SiHNH)_n$, in which n is about 3 to about 12, with at least one of the chlorosilanes $R^2SiHCl_2$, $R^3SiCl_3$, $Cl_2R^4Si$—$CH_2CH_2$—$SiR^4Cl_2$ or $Cl_3Si$—$CH_2CH_2$—$SiR^5Cl_2$ at 30° C. to 300° C., where the radicals independently of one another have the following meanings:

$R^1$ = a $C_1$-$C_6$ alkyl or $C_2$-$C_6$ alkenyl group, $R^2$ = a $C_2$-$C_6$ alkenyl group if $R^2SiHCl_2$ is reacted with the oligosilazanes by itself, or $R^2$ = a $C_1$-$C_6$ alkyl or $C_2$-$C_6$ alkenyl group if $R^2SiHCl_2$ is reacted with the oligosilazanes as a mixture with other chlorosilanes, and $R^3$, $R^4$, $R^5$ = a $C_1$-$C_6$ alkyl or $C_2$-$C_6$ alkenyl group, and where $R^3SiCl_3$ is used only as a mixture with at least one of the other chlorosilanes (containing $R^2$, $R^4$ or $R^5$). The reaction is preferably carried out with at least one of the chlorosilanes $R^2SiCl_2$, $Cl_2R^4Si$—$CH_2CH_2$—$SiR^4Cl_2$ or $Cl_3Si$—$CH_2CH_2$—$SiR^5Cl_2$.

Readily volatile by-products such as $R^1SiHCl_2$ and $R^1SiH_2Cl$, as well as some hydrogen, are formed in the reaction. These chlorosilanes, which are unavoidably obtained, can be separated by distillation. The chlorosilanes of the formula $R^1SiHCl_2$ can be re-used in a preliminary stage of the process according to the invention, i.e. in the preparation of the oligohydridoorganosilazanes (also called "oligosilazanes" below) used as the starting material. In this preliminary stage, the dichlorohydridoorganosilane $R^1SiHCl_2$, where $R^1$ is as defined above, is reacted with $NH_3$ in a solvent, as described in U.S. Pat. No. 4,482,669 (see especially columns 4, 5, 7, 8, in said document). This reaction generally yields a mixture of linear and cyclic oligohydridoorganosilazanes $(R^1SiHNH)_n$, where n is about 3 to about 12.

The radicals $R^1$ to $R^5$ in the oligosilazanes or chlorosilanes may be identical or different and preferably have 1 to 3 carbon atoms. It is especially preferred if $R^1=R^2=R^4=R^5=CH_3$ and $R^3CH_3$ or vinyl. The molar ratio of the reactants in the above reaction, namely chlorosilane: $R^1SiHNH$ unit of the oligosilazane, is preferably about 0.1:1 to 1.5:1, in particular 0.3:1 to 1:1.

The reactants are preferably reacted with one another by taking the oligosilazanes and adding the chlorosilanes thereto. As the reaction is exothermic, the temperature is preferably kept initially at 30° to 50° C. when the reactants are brought together. The reaction mixture is then heated to temperature of 100° to 100° C., preferably 120° to 250° C.

Some of the low-boiling components formed as by-products, such as $RSiHCl_2$, $RSiClH_2$, $RSiCl_3$, HCl, $H_2$, and $NH_3$ (where R is identical to $R^1$, $R^2$ or $R^3$), escape during the reaction. When the reaction is complete, the remaining low-boiling components are removed from the reaction vessel, generally by the application of a vacuum.

Most of the $NH_4Cl$ which is also formed in the reaction sublimes out of the reaction mixture in the course of the reaction. Any residual $NH_4Cl$ can be separated from the polymeric hydridochlorosilazane prepared according to the invention by extraction with an inert organic solvent such as n-hexane, toluene or ether.

The reaction time depends on the heating rate and the reaction temperature. A reaction time of 5 to 7 hours is generally sufficient.

The reaction is preferably carried out in the absence of a solvent, but it can also be carried out in an organic solvent. Suitable solvents are those which exhibit inert behavior towards the reactants and have a sufficiently high boiling point, e.g. saturated aliphatic or aromatic hydrocarbons such as n-decane, decalin, xylene or toluene, chlorinated hydrocarbons such as chlorobenzene, or ethers such as dibenzyl ether or diethylene glycol diethyl ether. When using a solvent in which the $NH_4Cl$ formed is insoluble, the latter can be separated off by filtration. The polymeric hydridochlorosilazanes according to the invention are then obtained by distillation of the solvent under reduced pressure.

If appropriate, the process can also be carried out under reduced pressure or at pressures in the range of from 1 to 10 atmospheres.

The process can also be carried out continuously.

The novel polymeric hydridochlorosilazanes prepared have a molecular structure which can be represented by formula (I)

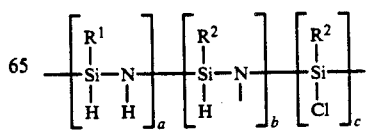

-continued

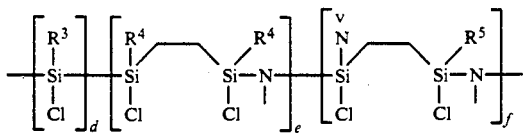

where the free valencies on the nitrogen atoms are saturated with H atoms or silyl radicals $R^*SiX-N<(X=H, Cl, N<, CH_2CH_2Si\leftarrow)$.

The radicals have the following meanings:
$R^1 =$ a $C_1$-$C_6$ alkyl or $C_2$-$C_6$ alkenyl group,
$R^2 =$ a $C_2$-$C_6$ alkenyl group if $d=e=f=0$, or
$R^2 =$ a $C_1$-$C_6$ alkyl or $C_2$-$C_6$ alkenyl group if at least one of the indices d, e, or $f \neq 0$, and
$R^3$, $R^4$, $R^5$, $R^* =$ a $C_1$-$C_6$ alkyl or $C_2$-$C_6$ alkenyl group.
a, b, c, d, e, and f are the mol fractions of the respective structure units and add up to a value of one. $R^1$ to $R^5$ and $R^*$ preferably have 1 to 3 carbon atoms and it is especially preferred if $R^1=R^2=R^4=R^5=R^*=CH_3$ and $R^3=CH_3$ or vinyl.

The polymeric hydridochlorosilazanes have a lattice structure. Whether the mol fractions b, c, d, e and f take positive values or the value zero depends on the chlorosilanes used in the reaction with the oligosilazane $(R^1HSi-NH)_n$. If $(R^1HSi-NH)_n$ is reacted only with $Cl_2R^4Si-CH_2CH_2-SiR^4Cl_2$, $b=c=d=f=0$; a and e take positive values. If $(R^1HSi-NH)_n$ is reacted with a mixture of $R^2HSiCl_2$ and $Cl_2R^4Si-CH_2CH_2-SiR^4Cl_2$, only $d=f=0$; a, b, c and e take positive values.

Accordingly, the present invention further relates to polymeric hydridochlorosilazanes of formula (I)

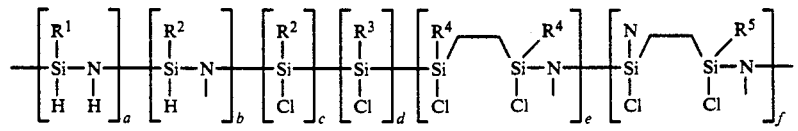

where the free valencies on the nitrogen atoms are saturated with H atoms or silyl radicals $R^*SiX-N<(X=H, Cl, N<, CH_2CH_2Si\leftarrow)$, where the radicals independently of one another have the following meanings:
$R^1 =$ a $C_1$-$C_6$ alkyl or $C_2$-$C_6$ alkenyl group,
$R^2 =$ a $C_2$-$C_6$ alkenyl group is $d=e=f=0$, or
$R^2 =$ a $C_1$-$C_6$ alkyl or $C_2$-$C_6$ alkenyl group if at least one of the indices d, e or $f \neq 0$, and
$R^3$, $R^4$, $R^5$ and $R^* =$ a $C_1$-$C_6$ alkyl or $C_2$-$C_6$ alkenyl group,
and where the case of $d \neq 0$ and $b=c=e=f=0$ simultaneously shall be excluded. The indices a-f can also take the value zero, as explained in greater detail above. The actual values of a-f can be determined by integration of the $^1H$ NMR spectra and by means of elemental analysis. In general, a is 0.1 to 0.9 and b, c, d and e are 0 to 0.6, where $a+b+c+d+e+f=1$. Preferred polymeric hydrochlorosilazanes are those in which a is 0.7 to 0.9, in particular 0.75 to 0.85. The preferred values of b, c, d, e and f are 0.01 to 0.3, in particular 0.01 to 0.2. These values can be checked via said analytical methods. The preferred values of a, b, c, d, e and f which have just been mentioned have proved particularly satisfactory in cases where a fiber is to be manufactured as the end product of pyrolysis (after conversion of the polymer chlorosilazanes into polysilazanes.

The present invention further relates to polymeric hydridochlorosilazanes which can be obtained by reacting oligosilazanes of the general formula $(R^1SiHNH)_n$, in which n is about 3 to about 12, with at least one of the chlorosilanes $R^2SiHCl_2$, $R^3SiCl_3$, $Cl_2R^4Si-CH_2CH_2-SiR^4Cl_2$ or $Cl_3Si-CH_2CH_2-SiR^5Cl_2$ at 30° C. to 300° C., where the radicals independently of one another have the following meanings:
$R^1 =$ a $C_1$-$C_6$ alkyl or $C_2$-$C_2$-$C_6$ alkenyl group,
$R^2 =$ a $C_2$-$C_6$ alkenyl group if $R^2SiHCl_2$ is reacted with the oligosilazanes by itself, or
$R^2 =$ a $C_1$-$C_6$ alkyl or $C_2$-$C_6$ alkenyl group if $R^2SiHCl_2$ is reacted with the oligosilazanes as a mixture with other chlorosilanes, and
$R^3$, $R^4$, $R^5 =$ a $C_1$-$C_6$ alkyl or $C_2$-$C_6$ alkenyl group,
and where $R^3SiCl_3$ is used only as a mixture with at least one of the other chlorosilanes (containing $R^2$, $R^4$ or $R^5$). The reaction is preferably carried out with at least one of the chlorosilanes $R^2SiHCl_2$, $Cl_2R^4Si-CH_2CH_2-SiR^4Cl_2$ or $Cl_3Si-CH_2CH_2-SiR^5Cl_2$.

$R^1$ to $R^5$ preferably have 1 to 3 carbon atoms; it is especially preferred if $R^1=R^2=R^4=R^5=CH_3$ and $R^3=CH_3$ or vinyl.

Preferably, the more readily volatile chlorosilanes $R^1SiH_2Cl$ and $R^1SiHCl_2$ which has been separated off is re-used to prepare the starting material $(R^1SiH-NH)_n$.

The novel polymeric hydridochlorosilazanes can be converted into polyhydridosilazanes by reaction with ammonia ("ammonolysis"), and these in turn can be converted by pyrolysis into ceramic material containing silicon nitride.

The ammonolysis can be carried out in liquid $NH_3$, although it is advantageous to carry it out in an organic solvent. Suitable solvents are all those which exhibit inert behavior towards the polymeric hydridochlorosilazanes. Preferred solvents are those in which the ammonium chloride obtained as a by-product has a low solubility and from which it can easily be separated off, e.g. ethers, aliphatic and aromatic hydrocarbons and chlorinated hydrocarbons. In the ammonolysis, the reactants can be fed into the reaction vessel in any order, but it is normally advantageous to take the polymeric hydridochlorosilazane in solution and pass in gaseous ammonia or add liquid ammonia. If the polymeric hydridochlorosilazanes according to the invention have been prepared in a suitable organic solvent, the ammonolysis can be carried out in this solvent without prior separation of the $NH_4Cl$. The ammonolysis is preferably carried out with an excess of $NH_3$ in order to ensure that the reaction is complete and the end products are as free from chlorine as possible. Twice the stoichiometric amount is generally sufficient for this purpose.

The reaction is generally carried out at a temperature of about $-50°$ to $+100°$ C., preferably at $-20°$ to $+30°$ C. and in particular at room temperature (in which case ice cooling is used). It is also possible, however, to carry out the reaction above room temperature, e.g. at the boiling point of the solvent used, or below room temperature, e.g. at $-33°$ C. when using liquid $NH_3$.

When the ammonolysis is complete, any excess NH$_3$ is removed and the ammonium chloride obtained is filtered off. The yield can be increased by washing the precipitate with one of the above-mentioned organic solvents. After distillation of the solvent under reduced pressure, the polyhydridosilazanes are obtained immediately as white powders. The polyhydridosilazanes are soluble in the above organic solvents, so they can be used either to coat surfaces or to manufacture fibers.

The polyhydridosilazanes can be pyrolyzed in an inert nitrogen or argon atmosphere, at temperatures of 800° to 1200° C., to form dense, amorphous materials which consist essentially of Si, N and C and can also contain traces of H and O. At pyrolysis temperatures above 1200° C., for instance in the range from 1200° C. to 1400° C., partially amorphous, microcrystalline ceramic materials are formed which contain $\alpha$-Si$_3$N$_4$ as a crystalline phase.

A particular advantage is that, before pyrolysis, the polyhydridosilazanes can be shaped by various processes to form three-dimensional shaped articles.

One important method of shaping is fiber drawing, where fibers can be drawn out of high-viscosity solutions of the polyhydridosilazane in solvents such as toluene, THF or hexane. The fibers are advantageously drawn by means of spinnerets with a diameter of 80 to 150 $\mu$m. Subsequent stretching makes the filament thinner, whereby a very strong filament with a diameter of 2 to 20 $\mu$m, in particular 5 to 15 $\mu$m, is formed after pyrolysis. The fibers manufactured by subsequent pyrolysis are used as mechanical reinforcing matrices in fiber-reinforced aluminum, aluminum alloys and ceramic components.

Another important method by which the polyhydridosilazanes can be processed is the manufacture of dense, strongly adhesive, amorphous or microcrystalline ceramic coatings on metals, in particular steel. The coatings are applied with the aid of a solution of the polyhydridosilazane in organic solvents such as toluene, THF or hexane. Pyrolytic conversion into an amorphous or microcrystalline layer takes place in the same temperature range of 800° to 1200° C. or 1200° to 1400° C., under an inert gas, in the manner described above for three-dimensional shaped articles.

On account of their outstanding adhesion, high hardness and surface quality, the ceramic coatings are particularly suitable for improving the surface of mechanically and chemically stressed machine components.

The polyhydridosilazanes described above can also be pyrolyzed in an NH$_3$ atmosphere rather than in an inert gas, with an equally high ceramic yield of 70 to 90%. This results in a practically carbon-free, transparent, colorless material. When pyrolysis is carried out in NH$_3$ at 1000° C., or above, the carbon content is less than 0.5% by weight. Depending on the pyrolysis temperature, the pyrolysis product consists of practically pure, amorphous silicon nitride (pyrolysis below 1200° C.) or crystalline Si$_3$N$_4$ (pyrolysis above 1200° C., in particular above 1300° C.). Pyrolysis in NH$_3$ can be applied to all the shaped articles manufactured by the shaping processes described above, i.e. articles shaped from powders, fibers and coatings.

Thus the invention further relates to a process for the manufacture of ceramic material containing silicon nitride, wherein the above-mentioned polymeric chlorosilazanes, characterized by their formula or the process for their preparation, are reacted with ammonia at −50° to +100° C. and the polysilazane formed is pyrolyzed in an inert nitrogen or argon atmosphere or in an ammonia atmosphere at 800° to 1400° C.

Preferably, however, the conversion of the polymeric chlorosilazanes into ceramic material containing silicon nitride is carried out in such a way that the polysilazanes formed as intermediates are not isolated. In this case, the polymeric chlorosilazanes are preferably reacted with gaseous ammonia and the reaction mixture formed is pyrolyzed in an ammonia atmosphere.

Accordingly, the present invention further relates to a process for the manufacture of ceramic material containing silicon nitride, wherein the above-mentioned polymeric chlorosilazanes, characterized by their formula or the process for their preparation, are reacted with ammonia at 0° to +300° C. and the reaction product is pyrolyzed in an NH$_3$ atmosphere at 800°–1400° C.

In this case, i.e. where the polysilazane formed as an intermediate is not isolated, the shaping process must of course take place at the polymeric chlorosilazane stage, i.e., fibers, coatings or shaped articles are manufactured from these polymeric chlorosilazanes and then reacted with NH$_3$ and pyrolyzed.

Experimental report

Preparation of oligohydridomethylsilazane, (CH$_3$SiHNH)$_n$ 100 ml (0.97 mol) of methyldichlorosilane were dissolved in 800 ml of absolute THF, and ammonia was passed in for 3 hours (flow rate: 0.5 l/min). The reaction temperature was kept in the range from 20° to 25° C. by cooling with an ice bath. The reaction was brought to completion by stirring for 1 h at room temperature and the ammonium chloride was then separated off under argon. The precipitate was washed with twice 350 ml of THF and the combined THF solutions were concentrated under reduced pressure to give a clear, readily mobile oil of (CH$_3$SiHNH)$_n$ with a yield of 44.5 g=78% of theory.

EXAMPLES

Example 1

Reaction of the oligosilazane (CH$_3$SiHNH)$_n$ with a mixture of vinyltrichlorosilane, CH$_2$=CHSiCl$_3$, and methyldichlorosilane, CH$_3$SiHCl$_2$, and subsequent pyrolysis to form material containing Si$_3$N$_4$.

54.6 g (0.93 mol) of (CH$_3$SiH-NH)$_n$ were dissolved in 150 ml of dry toluene, and 88.8 g (0.55 mol; 70 ml) of vinyltrichlorosilane and 5.6 g (0.05 mol; 5 ml) of methyldichlorosilane were added, with stirring. The mixture was then refluxed for 3 h to form a white precipitate.

All the volatile constituents were then distilled off, the pressure being reduced slowly to 0.1 mbar and the temperature increased slowly to 220° C. These constituents also contained CH$_3$SiHCl$_2$ and CH$_3$SiHCl in a ratio of 4 to 1 (no C$_2$H$_3$SiHCl$_2$ or C$_2$H$_3$SiH$_2$Cl). Under these conditions, the white precipitate which was originally produced sublimed to leave 43 g of a clear, colorless melt, which becomes a transparent solid at 20° C.

| $^1$H NMR data: | SiCH$_3$ | $\delta$ = 0.0–0.9 ppm (br), intens. 15 |
| --- | --- | --- |
| | NH | $\delta$ = 1.0–1.8 ppm (br), intens. 4 |
| | SiH | $\delta$ = 4.4–5.2 ppm (br), intens. 3 |
| | Si-vinyl | $\delta$ = 5.5–6.3 ppm (br), intens. 8 |

Elemental analysis (% by weight):
Found:   Si   36.2%   N   17.7%   Cl   14.7%

| | C | 25.3% | H | 5.3% | O | 0.3% |
|---|---|---|---|---|---|---|
| Calculated: | Si | 40.9% | N | 14.3% | Cl | 15.6% |
| | C | 22.8% | H | 6.4% | | |

Structure: formula (I) where $a=0.7$, $c=0.02$, $d=0.3$, $b=e=f=0$, $R^1=CH_3$, $R^3=$vinyl;

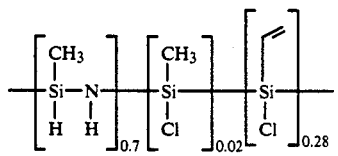

The ceramic yield of the subsequent pyrolysis was 84% in $N_2$ and 85% in Ar.

Example 2

Reaction of the oligosilazane $(CH_3SiHNH)_n$ with a mixture of methyldichlorosilane, $CH_3CiHCl_2$, and vinyltrichlorosilane, $CH_2=CHSiCl_3$, and subsequent pyrolysis to form material containing $Si_3N_4$.

30 g (0.51 mol) of $(CH_3SiHNH)_n$ were dissolved in 100 ml of dry toluene, and a mixture of 17.2 g (0.15 mol; 15.5 ml) of $CH_3SiHCl_2$ and 24.2 g (0.15 mol; 19.1 ml) of vinyltrichlorosilane were added, with stirring. The initially clear solution was then refluxed for 3 h to form a white precipitate.

All the volatile constituents were then distilled off, the pressure being reduced slowly to 0.1 mbar and the temperature increased slowly to 220° C. Under these conditions, $CH_3SiHCl_2$ and $CH_3SiH_2Cl$ were also present in a ratio of 2 to 1. Vinyldichlorosilane and vinylchlorosilane could not be detected.

Under said conditions, the while precipitate sublimed to leave 24.2 g of a clear, colorless melt, which became a transparent solid at 20° C.

| $^1$H NMR data: | SiCH$_3$ | $\delta = 0.0$–0.9 ppm (br), intens. 18 |
|---|---|---|
| | NH | $\delta = 1.0$–1.8 ppm (br), intens. 3.1 |
| | SiH | $\delta = 4.4$–5.2 ppm (br), intens. 3.7 |
| | Si-vinyl | $\delta = 5.5$–6.3 ppm (br), intens. 4.9 |
| Elemental analysis (% by weight): | | | | | | |
| Found: | Si | 39.6% | N | 17.4% | Cl | 12.7% |
| | C | 20.6% | H | 6.2% | O | 0.6% |
| Calculated: | Si | 42.5% | N | 15.7% | Cl | 14.0% |
| | C | 21.5% | H | 6.3% | | |

Structure: formula (I) where $a=0.46$, $b=0.28$, $c=0.08$, $d=0.18$, $e=f=0$, $R^1=R^2=CH_3$, $R^3=$vinyl:

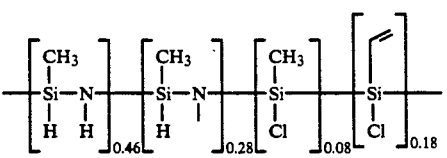

The ceramic yield of the subsequent pyrolysis was 82% in $N_2$ and 78% in Ar.

Example 3

Reaction of the oligosilazane $(CH_3SiHNH)_n$ with a mixture of methyldichlorosilane and methytrichlorosilane and subsequent pyrolysis to give material containing $Si_3N_4$.

The procedure corresponded to that described in Example 2, except that the starting materials were as follows:

31 g (0.53 mol) of $(CH_3SiHNH)_n$
18.4 g (0.16 mol) of $CH_3SiHCl_2$
23.9 g (0.16 mol) of $CH_3SiCl_3$ The condensate contained methyldichlorosilane and methylchlorosilane in a ratio of 1 to 1. 21 g of a clear, translucent, brittle substance were obtained.

| $^1$H NMR data: | SiCH$_3$ | $\delta = 0.0$–0.9 ppm (br), intens. 18 |
|---|---|---|
| | NH | $\delta = 1.0$–2.0 ppm (br), intens. 1.8 |
| | SiH | $\delta = 4.4$–5.2 ppm (br), intens. 2 |
| Elemental analysis (% by weight): | | | | | | |
| Found: | Si | 39.3% | N | 16.3% | Cl | 19.8% |
| | C | 18% | N | 6.1% | | |
| Calculated: | Si | 42.7% | N | 17.1% | Cl | 21.6% |
| | C | 18.3% | | | | |

Structure: formula (I) where $a=0.2$, $b=0.4$, $d=0.4$, $c=e=f=0$, $R^1=R^2=CH_3$, $R^3=CH_3$:

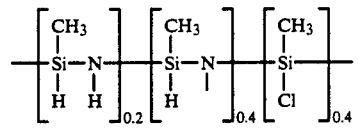

The ceramic yield of the subsequent pyrolysis was 62% in $N_2$ and 66% in Ar.

Example 4

Reaction of the oligosilazane $(CH_3SiHNH)_n$ with 1,2-bis(methyldichlorosilyl)ethane, $Cl_2CH_3Si-CH_2-CH_2-SiCH_3Cl_2$, and subsequent pyrolysis to form material containing $Si_3N_4$.

The procedure corresponded to that described in Example 1, except that the starting materials were as follows:

45 g (0.76 mol) of $(CH_3SiH-NH)_n$
70 g (0.27 mol) of $Cl_2CH_3Si-CH_2-CH_2-SiCH_3Cl_2$ 35.3 g of a clear, yellowish, transparent substance were obtained.

| $^1$H NMR data: | | |
|---|---|---|
| SiCH$_3$ and Si—CH$_2$CH$_2$—Si | $\delta = 0.0$–0.9 ppm (br), intens. 19 |
| NH | $\delta = 0.9$–1.3 ppm (br), intens. 0.3 |
| SiH | $\delta = 4.5$–5.1 ppm (br), intens. 1.1 |
| Elemental analysis (% by weight): | | | | | | |
| Found: | Si | 35.1% | N | 13.3% | Cl | 17.4% |
| | C | 25.2% | H | 6.4% | | |
| Calculated: | Si | 36.0% | N | 13.9% | Cl | 21.1% |
| | C | 22.6% | H | 6.4% | | |

Structure: formula (I) where $a=0.7$, $e=0.3$, $b=c=d=f=0$, $R^1=R^4=CH_3$:

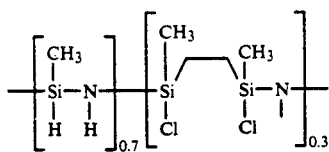

What is claimed is:

1. A polymeric hydridochlorosilazane of formula (I)

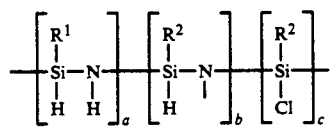

where the free valencies on the nitrogen atoms are saturated with H atoms or silyl radicals

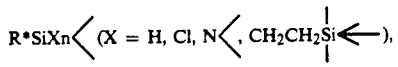

where the radicals independently of one another have the following meanings:
- $R^1$ = a $C_1$-$C_6$ alkyl or $C_2$-$C_6$ alkenyl group,
- $R^2$ = a $C_2$-$C_6$ alkenyl group is $d=e=f\neq 0$, or
- $R^2$ = a $C_1$-$C_6$ alkyl or $C_2$-$C_6$ alkenyl group if at least one of the indices d, e, or f=0, and
- $R^3$, $R^4$, $R^5$ and $R^*$ = a, $C_1$-$C_6$ alkyl or $C_2$-$C_6$ alkenyl group, and where the indices a, b, c, d, e, and f represent the mol fractions of the respective structural units and add up to a value of one; the index a being 0.1 to 0.9, the index d being from zero to about 0.3, at least one of the indexes b, c, e and f not being zero, and when the index d is not zero, the value of at least one of the indices b, c, e, or f being 0.01 to about 0.3.

2. A polymeric hydridochlorosilazane as claimed in claim 1, wherein $R^1$ and $R^3$ to $R^5$ and $R^*$ are $C_1$-$C_3$ alkyl or $C_2$-$C_3$ alkenyl, and $R^2$ is $C_2$-$C_3$ alkenyl if $d=e=f=0$, or $R^2$ is $C_1$-$C_3$ alkyl or $C_2$-$C_3$ alkenyl, if at least one of the indices d, e, and f is not zero.

3. A polymeric hydridochlorosilazane as claimed in claim 1, wherein $R^1=R^3=R^4=R^5=R^*=CH_3$ or vinyl, and $R^2$=vinyl, if $d=e=f=0$, or $R^2=CH_3$ or vinyl, if at least one of the indices d, e, and f is not zero.

4. A polymeric hydridochlorosilazane as claimed in claim 1, wherein the index d is zero.

5. A polymeric hydridochlorosilazane as claimed in claim 1, wherein the indices e and f are not zero.

* * * * *